United States Patent Office 3,142,954
Patented Aug. 4, 1964

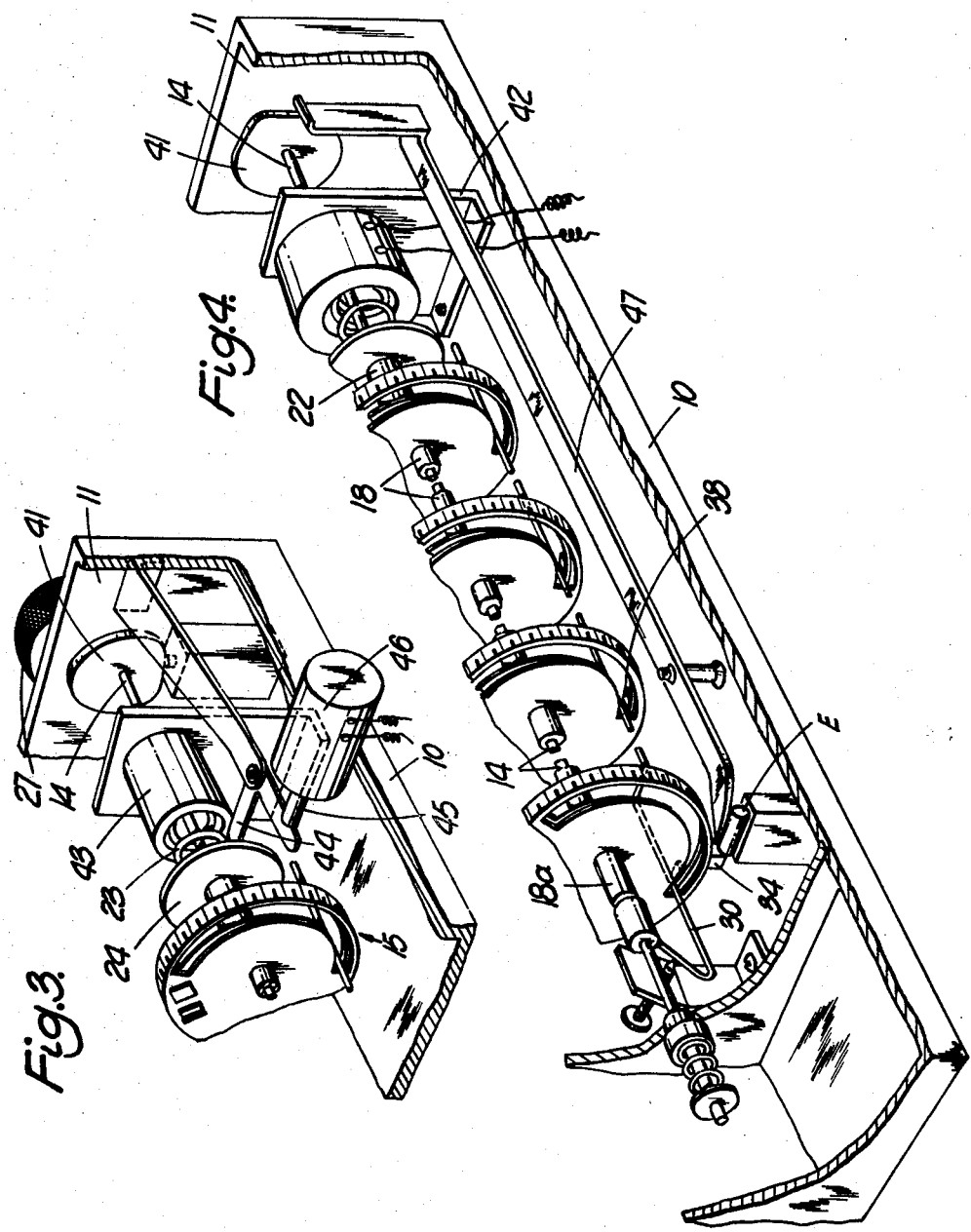

3,142,954
TIMING DEVICES
Geoffrey Redmayne, The Wall House, North Road,
Hertford, England
Filed Nov. 7, 1962, Ser. No. 236,084
Claims priority, application Great Britain Nov. 7, 1961
26 Claims. (Cl. 58—22.9)

This invention relates to timing devices particularly for timing the response of an individual to visual and other stimuli and has for an object to provide a device which is simple and cheap to manufacture and yet enables comparatively small time intervals of an order of 10 milli-seconds to be indicated.

According to this invention a timing device comprises a number of indicating members so mounted as to be individually movable in an oscillatory or reciprocatory manner, in one direction against a loading force and in an oppoiste direction under the action of the loading force, operator controlled means for moving the indicating members against their loading forces to limiting positions, operator controlled means the actuation of which causes one of said indicating members to move under the action of its loading force, lost motion devices between said various indicating members so arranged that a predetermined extent of movement of said one indicating member causes another of said indicating members to move under the action of its loading force and a predetermined movement of that member causes the next indicating member to move under the action of its loading force and so on, and operator controlled means for arresting any one of the indicating members which may be moving under the action of its loading force.

Means may be provided for retaining said indicating members in their first said limiting positions and said predetermined movement of said one indicating member renders the retaining means of said other indicating member inoperative whereby its loading force moves it to an extent determined by the lost motion device whereupon it renders the retaining means of the next indicating member inoperative and so on.

Preferably said loading force is a gravitational force.

The indicating members may be mounted to oscillate and are eccentrically loaded and the first said operator controlled moves them so that their centres of gravity move upwardly from a lower limiting position below the axis of oscillation.

Preferably said indicating members, including said one indicating member are so loaded and their extents of movement are so chosen that their angular momentums built up under gravity are substantially the same when their centres of gravity approach their lower limiting positions whereby the impact forces transmitted to the various indicating members are the same and the calibrations for the scales are the same except for said one indicating member.

In one form of construction means are provided for retaining said one indicating member with its centre of gravity to one side of the axis of oscillation and the other indicating members with their centres of gravity on the other side of the axis of oscillation adjacent top dead centre positions and wherein said operator controlled means is arranged to release said one indicating member so that its centre of gravity descends on the same side of the axis of oscillation as it was retained and in descending moves another indicating member so that its centre of gravity moves from one side to the other of a dead centre position and then descends and in so doing moves the next retaining member and so on.

The indicating members may be mounted to oscillate about the same axis and aforesaid lost motion devices may comprise axially extending projections on opposite sides of each indicating member spaced circumferentially apart and so arranged that the path of movement of a projection on one side of each member intersects a projection on the adjacent side of a neighbouring member.

The said retaining means for the indicating members, except for said one indicating member may comprise a rod arranged substantially parallel to and spaced from said spindle and extending through arcuate slots in said discs which slots are so disposed in relation to the centres of gravity of the indicating members that when the rod is engaged with one end of each slot the centres of gravity are near top dead centre position and wherein said one indicating member is provided with separate operator controlled retaining means which retain it with its centre of gravity to one side of the axis of oscillation and which when released by the operator causes said centre of gravity of the one indicating member to move downwardly and in so doing moves an adjacent indicating member away from its position near top dead centre.

The length of said slots in the indicating member may be such that the rod arrests the members when their centres of gravity are in the neighbourhood of the bottom dead centre positions.

The aforesaid indicating members may be both rotatable and axially slidable on said spindle with or without distance pieces between them and may be disposed between two abutments relatively movable towards and away from one another and at least one of which is retained against rotation and means for imparting said relative movement whereby indicating members and distance pieces when used may be jammed together and against said non rotatable abutment and arrested against rotation.

The indicator may be associated with that operator controlled means which causes said one indicating member to move under the action of its loading means so as to indicate when the timing device has been set into operation. In such an arrangement the operator controlled means which cause said one indicating member to move under the action of its loading force is so interconnected with means under the control of a person undergoing the test that should that person start to actuate the arresting means before the operator controlled means have been actuated, a warning device is brought into operation.

Other features of the invention are set out in the accompanying description, which description is made with reference to the accompanying drawings in which:

FIGURE 3 is a diagrammatic exploded perspective view of a modified form of the invention, with parts broken away and parts in section; and FIGURE 4 is a view similar to FIGURE 3 showing a further modification of the invention.

Figure 1:
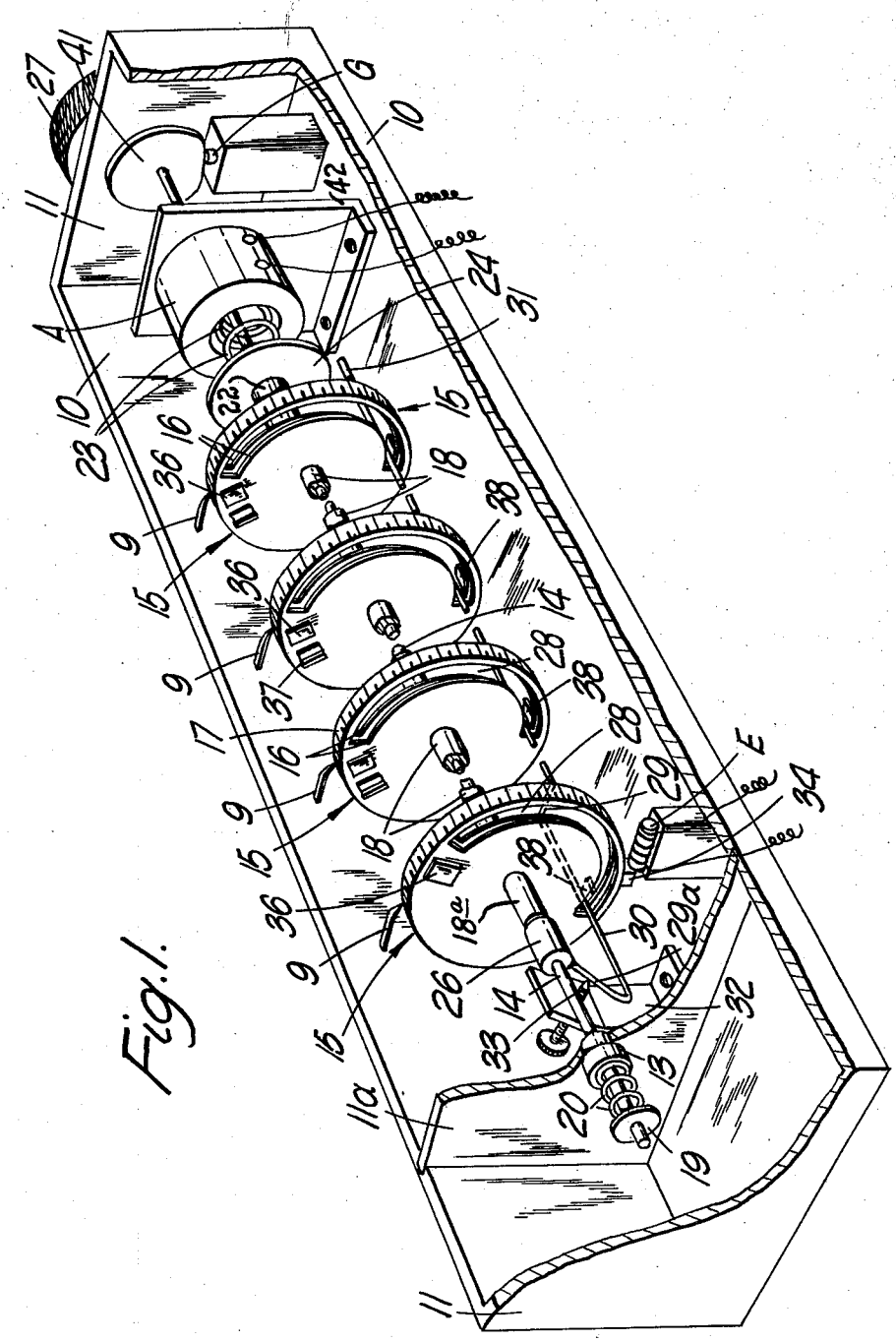
FIGURE 1 is a diagrammatic exploded perspective view of one form of timing device, certain parts being shown broken away for clarity.

The apparatus may comprise a case having side walls 10, end walls 11 and a bottom 12 and an internal partition 11a. Rotatable in bearings fixed in one end wall 11 and in partition 11a, only the latter bearing 13 being shown, is a spindle 14 on which are mounted a number of indicating members 15 each made up of two discs 16 secured together around their circumference by a rim part 17 bearing an indicating scale marked in milliseconds and which travel over fixed index pointers 9 on the case.

The indicating members are spaced apart by tubular spacing members 18 which encircle the spindle. One end of the spindle which projects into the space between the partition 11a and an end wall of the case has fixed to it an abutment disc 19 and the spindle is encircled by a compression spring 20 disposed between the abutment disc and one of the bearings 13.

The other end of the spindle 14 within the case is encircled by a tubular braking member 22, one end of the tubular member being disposed opposite the center of the end indicator member 15. The other end of the tubular braking member remote from the end indicating member 15 has fixed to it an armature 24 disposed opposite an electro-magnet A carried on a bracket 42 mounted on the bottom wall 12 of the case. Encircling the spindle 14 between the armature 24 and said bracket 42 is a compression spring 23 which extends through electro-magnet A.

The spring 23 moves the armature away from the electro-magnet when the latter is de-energised and thus the set of indicating members are pressed towards one another by the braking member 22 against the tubular spacing members 18 and the indicating member at the opposite end from the braking member is pressed against a hub portion 26 which is fixed to the spindle 14, a tubular spacing member 18a being disposed between it and the fixed hub portion. A permanent magnet 43 may be employed in place of the electro-magnet A (see FIGURE 3) and the armature 24 may be forced away from the permanent magnet at the required time by means of a magnetically operated lever arm 44 pivotally mounted on the adjacent end wall of the case and having one end underlying the armature 24 and the other end arranged opposite a pole 45 of an electro-magnet 46 which is energised at a required time.

In this arrangement the electro-magnet is only energised when the switch (FIGURE 2) is operated by the person being tested whereas the electro-magnet of the first arrangement remains energised until the switch is operated by the person being tested.

The various discs 16 are formed with arcuate slots 28. The hub portion 26 has fixed to it a cranked rod as to provide two radially extending portions 29 and 29a and two axially extending portions 30, 31 the former of which 30 extends through the arcuate slot in the indicating member adjacent said hub portion, the other portion 31 of the rod extending through the arcuate slots in all the other indicating members.

Another bracket 32 is secured to the bottom 12 of the casing and carries an adjustable abutment screw 33 so as to lie in the path of movement of the radially extending portion 29a of said rod.

The indicating member adjacent the hub portion 26 has secured to its rim portion a soft iron armature 34 which is angularly disposed away from an end of the slot and is arranged to engage a pole of the electro-magnet E fixed to the bottom of the case.

The end of the spindle 14 remote from the spring 20 projects through the end wall 11 of the case and is provided with a manipulating member 27.

The spindle 14 between the manipulating member 27 and the nearest indicating member is arranged to have considerable torsional resilience so that the manipulating member can be further rotated after the radial portion 29a has been brought into engagement with the abutment screw 33 and this further rotation is arranged to open a micro switch G in circuit with the electro-magnet E. The operation of the micro-switch may be by way of a cam 41 fixed to the spindle 14 adjacent the inner face of the end wall 11.

In an alternative arrangement shown in FIGURE 4 the magnet E may be a permanent magnet and said further rotation of the manipulating member is arranged through a suitable transmission member 47 associated with the cam 41 to force the armature 34 away from the influence of the permanent magnet thereby enabling the centre of gravity of the left hand indicating member to fall.

Each of the indicating members has fixed to it adjacent one end of the slot a weight 36 and, except for the left hand indicating member, an axially extending projection 37 extends from the same side of the indicating member as said weight and adjacent to it. Each of the indicating members, except for the right hand one, has secured to it, on the opposite side thereof and at the other end of the slot to said weight, a further projection 38 the arrangement being such that as each indicating member rotates from a position where the weight is disposed near the upper dead centre position to a position where the weight is disposed towards the lower dead centre position a projection 38 on one indicating member engages a projection 37 on an adjacent indicating member moving it past the dead centre position whereupon the said adjacent disc rotates towards its other dead centre position, and rotation of the discs in this manner takes place successively unless the electro-magnet A is de-energised, for example, by a person taking a test who opens against the action of a spring, the switch L (FIGURE 2) whereby the electro-magnet A is de-energised whereupon the spring 23 moves the indicating members together by reason of the braking member 22 being forced by the spring 23 against the end of the indicating member 15 and causes frictional engagement to take place between the various distance pieces and the side faces of the indicating members and between the distance piece 18a and the hub portion 26. The switch automatically closes ready for the next test. Since the arm 29a has been brought into engagement with the adjustable abutment screw 33 the hub 26 is prevented from rotation and the frictional resistance between the various distance pieces 18 and 18a and the indicating members ensures that at least one of the discs may be arrested before it completes its rotation. Before re-setting the discs the spindle is moved axially against the action of springs 20 and 23 so as to bring the armature 24 on the braking member 22 into contact with the electro-magnet A where it is retained, the magnet having been previously energised as set out above and the spindle 14 is allowed to return to its original position under the action of the spring 20. The brake is thus removed and the discs may be reset. To carry this out the spindle is rotated in a direction to move the radial arm 29a away from the abutment screw 33 so that the axially extending portions 30, 31 of the cranked rod engage the ends of the slots adjacent the weights 36 and thereby rotate the discs. The left hand indicating member will be arrested when the armature 34 on its rim portion contacts a pole of the electro-magnet E which will then have been re-energised due to the torque in the rod 14 being released and the relative position of the armature and weight on that member are such that the disc is arrested before the weight 36 reaches its upper dead centre position. Due to the portion 31 of the rod leading the portion 30, the weights 36 on the indicating members engaged by the portion 31 will have reached their top dead centre positions by the time the left hand indicating member is arrested and will have carried on beyond the top dead centre positions and fallen to the bottom dead centre positions. The spindle is then rotated in the opposite direction so as to engage the other ends of the slots in the other indicating members until the radially extending portion 29a of the cranked rod reaches the abutment 33, when the weights on the other indicating members will be on the opposite side of the top dead centre position to the weight on the first said indicating member. To prevent the inertia of the indicating members carrying their centres of gravity to the same side as the centre of gravity of the left hand member and then falling back again to the bottom dead centres, removable detent means may be arranged temporarily in the path of movement of the projections 37 which detent means are withdrawn under the influence of the electro-magnet E through a suitable transmission when the operator releases the left hand indicating member.

As described above, when the radial portion 29a of the cranked rod meets the abutment 33, further rotation of the manipulating member operates the micro-switch thereby de-energising the electro-magnet E and allowing the left-hand end indicating member to rotate towards the bottom dead centre position; in so doing its projection 38 comes into engagement with the projection 37 on the adjacent indicating member causing the weight to move from one side to the other of the upper dead centre position whereupon that indicating member will rotate towards the bottom dead centre position and in so doing its projection 38 will engage the projection 37 on the other indicating member causing it also to rotate and so on.

As previously indicated the weight 36 on the left hand indicating member requires to be heavier than a weight on any of the other indicating members so that the angular momentum of the left hand indicating member may be built up under gravity to substantially the same value as the angular momentum of any of the other indicating members by the time their centres of gravity approach their lower positions, since it will be appreciated that the left hand indicating member is not started off by a blow as are the others. By arranging the various indicating members except the left hand one to be started off by percussive forces of the same value the calibration of their scales may be the same whereas the scale on the left hand indicating member will require to be more closely spaced.

Figure 2:
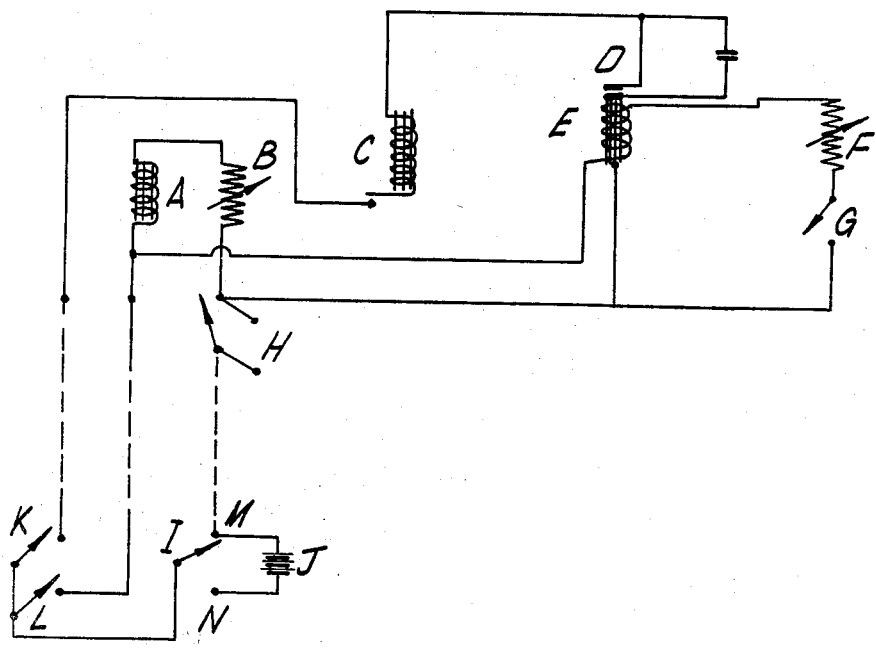
FIGURE 2 is a circuit diagram showing how the apparatus can be associated with switches actuated by a person supervising a test and by a person taking a test.

FIGURE 2 shows how the aforesaid electro-magnets A and E and the switch G may be connected in circuit with other electrical gear arranged to demonstrate how quickly a motorist in response to a visual stimulus can release his accelerator and actuate his brake control.

The switch G which is actuated by a person conducting the test controls the electro-magnet E. The armature D of the electro-magnet is arranged to control of pairs of contacts which are in circuit with an electro-magnetically operated buzzer C which is also in circuit with switch K. The switches K and L are actuated by movements of the accelerator and brake pedals respectively of a motor vehicle by the person taking the test. The switch L associated with the brake pedal controls the electro-magnet A which releases the aforesaid spring 23 for pressing the indicating members together thereby arresting whichever indicating member may be in movement.

The switches H and I are employed for bringing into the circuit either a battery J or a source of electric power provided by the output H of a transformer. When the electro-magnet E is energized by the person conducting the test by closing the switch G, the electro-magnet provides a retaining means for the first indicating member. When the electro-magnet E is de-energized by the person conducting the test it ceases to act as retaining means and simultaneously causes a light (not shown) to be switched on which indicates to a person taking the test that he should decelerate and apply the brakes. The release of the accelerator closes the switch K but since the contacts controlled by the armature D have previously been opened as indicated above, the release of the accelerator pedal has no effect, whereas the actuation of the brake pedal opens the switch L which is in circuit with the electro-magnet A. Thus the armature 24 is moved by the spring 23 as indicated above and clamps the various indicating members 15 together preventing further rotation of that one which was previously in motion. It will be seen that the circuit arrange is such that should the person taking the test, in an attempt to anticipate the action of the supervisor, close the switch K before the supervisor has opened the switch G the buzzer will operate.

I claim:

1. A timing device comprising a number of indicating members so mounted as to be individually movable in opposite senses, in one sense against a loading force and in an opposite sense under the action of the loading force, manually operable means for moving the indicating members against their loading forces to limiting positions, manually operable means the actuation of which causes one of said indicating members to move under the action of its loading force, lost motion devices between said various indicating members so arranged that a predetermined extent of movement of said one indicating member causes another of said indicating members to move under the action of its loading force and a predetermined movement of that member causes the next indicating member to move under the action of its loading force, and so on, and manually operable means for arresting any one of the indicating members which may be moving under the action of its loading force.

2. A timing device according to claim 1 wherein means are provided for retaining said indicating members in their first said limiting positions and said predetermined movement of said one indicating member renders the retaining means of said other indicating member inoperative whereby its loading force moves it to an extent determined by the lost motion device whereupon it renders the retaining means of the next indicating member inoperative, and so on.

3. A timing device according to claim 1 wherein said loading force is a gravitational force.

4. A timing device according to claim 1 wherein said indicating members are mounted to oscillate and are eccentrically loaded and the first said manually operable means moves them so that their centres of gravity move upwardly from a lower limiting position below the axis of oscillation.

5. A timing device according to claim 1 and in which the indicating members are mounted to oscillate about the same axis wherein the lost motion devices comprise axially extending projections on opposite sides of each indicating member spaced circumferentially apart and so arranged that the path of movement of a projection on one side of each member intersects a projection on the adjacent side of a neighbouring member.

6. A timing device according to claim 1 wherein an indicator is associated with that manually operable means which cause said one indicating member to move under the action of its loading force so as to indicate when the timing device has been set into operation.

7. A timing device according to claim 6 wherein the manually operable means which cause said one indicating member to move under the action of its loading force, is so interconnected with means under the control of the person undergoing the test that should that person start to actuate the arresting means before the manually operable means have been actuated a warning device is brought into action.

8. A timing device according to claim 1 wherein said indicating members are mounted to oscillate and are eccentrically loaded and the first said manually operable means moves them so that their centers of gravity move upwards from a lower limiting position below the axis of oscillation, means are provided for retaining said one indicating member with its centre of gravity to one side of the axis of oscillation and the other indicating members with their centres of gravity on the other side of the axis of oscillation adjacent top dead centre positions and wherein the first said manually operable means is arranged to release said one indicating member so that its centre of gravity descends on the same side of the axis of oscillation as it was retained and in descending moves another indicating member so that its centre of gravity moves from one side to the other of a dead centre position and then descends and in so doing moves the next retaining member and so on.

9. A timing device according to claim 8 wherein said indicating members including said one indicating member are so loaded and their extents of movements so chosen that their angular momentums built up under gravity are substantially the same when their centres of gravity approach their lower limiting positions whereby the impact forces transmitted to the various indicating members are the same and the calibrations for the scales are the same except for said one indicating member.

10. A timing device according to claim 8 wherein said indicating members are all rotatably mounted on a spindle so as to be co-axial with one another.

11. A timing device according to claim 8 wherein said indicating members are all rotatably mounted on the spindle so as to be coaxial with one another and wherein said indicating members comprise discs having rim portions bearing time scales and weights secured to said discs arranged to provide said eccentric loading.

12. A timing device according to claim 8 and in which said indicating members comprise discs which are all rotatably mounted on a spindle and are eccentrically loaded and wherein said retaining means for said indicating members, except for said one indicating member, comprise a rod arranged substantially parallel to and spaced from said spindle and extending through arcuate slots in said discs which slots are so disposed in relation to the centres of gravity of the loaded discs that when the rod is engaged with one end of each slot the centres of gravity are near top dead centre position and wherein said one indicating member is provided with separate manually operable retaining means which retain it with its centre of gravity to one side of the axis of oscillation and which when released by the operator causes said centre of gravity of the one indicating member to move downwardly and in so doing moves an adjacent indicating member away from its position near top dead centre.

13. A timing device according to claim 8 wherein said indicating members including said one indicating member are so loaded and their extents of movements so chosen that their angular momentums built up under gravity are substantially the same when their centers of gravity approach their lower limiting positions whereby the impact forces transmitted to the various indicating members are the same and the calibrations for the scales are the same except for said one indicating member and wherein the load on said one indicating member is greater than those on the other indicating members.

14. A timing device according to claim 8 wherein said indicating members are all rotatably mounted on a spindle so as to be co-axial with one another and wherein said indicating members comprise discs having rim portions bearing time scales and weights secured to said discs arranged to provide said eccentric loading and wherein each said indicating member comprises two discs spaced axially apart and secured together by a rim portion which discs are provided with central holes through which said spindle loosely extends.

15. A timing device according to claim 8 and in which said indicating members comprise discs which are all rotatably mounted on a spindle and are eccentrically loaded wherein said retaining means for said indicating members, except for said one indicating member, comprise a rod arranged substantially parallel to and spaced from said spindle and extending through arcuate slots in said discs which slots are so disposed in relation to the centers of gravity of the loading discs that when the rod is engaged with one end of each slot the centers of gravity are near top dead center position and wherein said one indicating member is provided with separate manually operable retaining means which retain it with its center of gravity to one side of the axis of oscillation and which when released by the operator causes said center of gravity of the one indicating member to move downwardly and in so doing moves an adjacent indicating member away from its position near top dead center and wherein said separate retaining means is arranged to retain said one indicating member on the opposite side of the top dead center position to those of the other indicating members so that when it is released it falls on the same side of the top dead center position where it had been retained and moves an adjacent indicating member so that the ends of its slot leave said rod and its center of gravity moves from one side to the other of its top dead center position and then falls, rotating the member, and after a predetermined extent of said rotation a projection on that member engages a projection on a neighboring indicating member and moves the end of its slot away from the rod its center of gravity from one side to the other of a top dead center position, and so on.

16. A timing device according to claim 8 and in which said indicating members comprise discs which are all rotatably mounted on a spindle and are eccentrically loaded wherein said retaining means for said indicating members, except for said one indicating member, comprise a rod arranged substantially parallel to and spaced from said spindle and extending through arcuate slots in said discs which slots are so disposed in relation to the centers of gravity of the loaded discs that when the rod is engaged with one end of each slot the centers of gravity are near top dead center position and wherein said one indicating member is provided with separate manually operable retaining means which retain it with its center of gravity to one side of the axis of oscillation and which when released by the operator causes said center of gravity of the one indicating member to move downwardly and in so doing moves an adjacent indicating member away from its position near top dead center and wherein said rod is arranged to be in engagement with the ends of the slots when the centers of gravity of the indicating members are near their top dead center positions and means are provided for imparting swinging movement to said rod after said ends of the slots in the indicating members have moved away from the rod so that the indicating members may be moved back to their limiting positions by engaging the rod successively with opposite ends of the slots ultimately bringing the rod into engagement with stop means when the indicating members are in their limiting positions.

17. A timing divice according to claim 8 and in which said indicating members comprise discs which are all rotatably mounted on a spindle and are eccentrically loaded wherein said retaining means for said indicating members, except for said one indicating member, comprise a rod arranged substantially parallel to and spaced from said spindle and extending through arcuate slots in said discs which slots are so disposed in relation to the centers of gravity of the loaded discs that when the rod is engaged with one end of each slot the centers of gravity are near top dead center position and wherein said one indicating member is provided with separate manually operable retaining means which retain it with its center of gravity to one side of the axis of oscillation and which when released by the operator causes said center of gravity of the one indicating member to move downwardly and in so doing moves an adjacent indicating member away from its position near top dead center and wherein a part of said rod may also extend through an arcuate slot in said one indicating member for the purpose of re-setting it with the other members.

18. A timing device according to claim 8 and in which said indicating members comprise discs which are all rotatably mounted on a spindle and are eccentrically loaded wherein said retaining means for said indicating members, except for said one indicating member, comprise a rod arranged substantially parallel to and spaced from said spindle and extending through arcuate slots in said discs which slots are so disposed in relation to the centers of gravity of the loaded discs that when the rod is engaged with one end of each slot the centers of gravity are near top dead center position and wherein said one indicating member is provided with separate manually operable retaining means which retain it with its center of gravity to one side of the axis of oscillation and which when released by the operator causes said center of gravity of the one indicating member to move downwardly and in so doing moves an adjacent indicating member away from its position near top dead center and wherein said separate retaining means is arranged to retain said one indicating member on the opposite side of the top dead center position to those of the other indicating members so that when it is released it falls on the same side of the top dead center position where it had been retained and moves an adjacent indicating member so that the ends of its slot leave said rod and its center of gravity moves from one side to the other of its top dead center position and then falls, rotating the member, and after a predetermined extent of said rotation a projection on that member engages a projection on a neighboring indicating member and moves the end of its slot away from the rod its center of gravity from one side to the other of a top dead center position and so on and wherein the weight on said one indicating member is similarly disposed in relation to its arcuate slot as in the other members and said rod is provided with a cranked portion which is disposed in the slot in said one member so that it may locate the weight on the opposite side of a dead center position to that on which the centers of gravity of the other members are located.

19. A timing device according to claim 8 and in which said indicating members comprise discs which are all rotatably mounted on a spindle and are eccentrically loaded wherein said retaining means for said indicating members, except for said one indicating member, comprise a rod arranged substantially parallel to and spaced from said spindle and extending through arcuate slots in said discs which slots are so disposed in relation to the centers of gravity of the loaded discs that when the rod is engaged with one end of each slot the centers of gravity are near top dead center position and wherein said one indicating member is provided with separate manually operable retaining means which retain it with its center of gravity to one side of the axis of oscillation and which when released by the operator causes said center of gravity of the one indicating member to move downwardly and in doing so moves an adjacent indicating member away from its position near top dead center and wherein the length of the slots in the indicating members are such that the rod arrests the members when their centers of gravity are in the neighborhood of the bottom dead center positions.

20. A timing device according to claim 8 and in which said indicating members comprise discs which are all rotatably mounted on a spindle and are eccentrically loaded wherein said retaining means for said indicating members, except for said one indicating member, comprise a rod arranged substantially parallel to and spaced from said spindle and extending through arcuate slots in said discs which slots are so disposed in relation to the centers of gravity of the loaded discs that when the rod is engaged with one end of each slot the centers of gravity are near top dead center position and wherein said one indicating member is provided with separate manually operable retaining means which retain it with its center of gravity to one side of the axis of oscillation and which when released by the operator causes said center of gravity of the one indicating member to move downwardly and in so doing moves an adjacent indicating member away from its position near top dead center and wherein said spindle is rotatable and said rod is attached thereto.

21. A timing device according to claim 8 and in which said indicating members comprise discs which are all rotatably mounted on a spindle and are eccentrically loaded wherein said retaining means for said indicating members, except for said one indicating member, comprise a rod arranged substantially parallel to and spaced from said spindle and extending through arcuate slots in said discs which slots are so disposed in relation to the centers of gravity of the loaded discs that when the rod is engaged with one end of each slot the centers of gravity are near top dead center position and wherein said one indicating member is provided with separate manually operable retaining means which retain it with its center of gravity to one side of the axis of oscillation and which when released by the operator causes said center of gravity of the one indicating member to move downwardly and in so doing moves an adjacent indicating member away from its position near top dead center and wherein said manually operable retaining means for said one indicating member comprise a magnet on a fixed part of the device and an armature on said indicating member.

22. A timing device according to claim 8 and in which said indicating members comprise discs which are all rotatably mounted on a spindle and are eccentrically loaded wherein said retaining means for said indicating members, except for said one indicating member, comprise a rod arranged substantially parallel to and spaced from said spindle and extending through arcuate slots in said discs which slots are so disposed in relation to the centers of gravity of the loaded discs that when the rod is engaged with one end of each slot the centers of gravity are near top dead center position and wherein said one indicating member is provided with separate manually operable retaining means which retain it with its center of gravity to one side of the axis of oscillation and which when released by the operator causes said center of gravity of the one indicating member to move downwardly and in so doing moves an adjacent indicating member away from its position near top dead center wherein said spindle is rotatable and said rod is attached thereto and wherein said magnet is either a permanent magnet and said control is arranged to move the armature away from the influence of the magnet or the magnet is an electromagnet and the operator control comprises a switch in circuit with the magnet and a source of supply.

23. A timing device according to claim 8 and in which said indicating members comprise discs which are all rotatably mounted on a spindle and are eccentrically loaded wherein said retaining means for said indicating members, except for said one indicating member, comprise a rod attached to the spindle and arranged substantially parallel to and spaced from said spindle and extending through arcuate slots in said discs which slots are so disposed in relation to the centers of gravity of the loaded discs that when the rod has been swung in one direction by rotation of the spindle and is engaged with one end of each slot the centers of gravity are near top dead center position and wherein said one indicating member is provided with separate manually operable retaining means which retain it with its center of gravity to one side of the axis of oscillation and which when released by the operator causes said center of gravity of the one indicating member to move downwardly and in so doing move an adjacent indicating member away from its position near top dead center when said ends of the slots in the indicating members have moved away from the rod due to the rotation of the indicating members away from the top dead center position, the indicating members may be moved back to their limiting positions by movement of the rod successively in opposite directions to engage successively with opposite ends of the slots ultimately bringing the rod into engagement with stop means when the indicating members are in their limiting positions and wherein said spindle is rotatable and said rod is attached thereto and wherein said spindle is connected to a manipulating member by torsionally resilient means so that when said stop means are engaged further rotation of the manipulating means is arranged to release said separate retaining means for said one indicating member.

24. A timing device according to claim 8 wherein said indicating members are all rotatably mounted on the spindle so as to be coaxial with one another and wherein said indicating members are both rotatable and axially slidable on said spindle with or without distance pieces between them and are disposed between two abutments relatively movable towards and away from one another and at least one of which is retained against rotation and means for imparting said relative movement whereby the indicating members, and distance pieces when used, may be jammed together and against said non-rotatable abutment and arrested against rotation.

25. A timing device according to claim 8 wherein said indicating members are all rotatably mounted on a spindle so as to be coaxial with one another and wherein said indicating members are both rotatable and axially slidable on said spindle with or without distance pieces between them and are disposed between two abutments relatively movable towards and away from one another and at least one of which is retained against rotation and means for imparting said relative movement whereby the indicating members, and distance pieces when used, may be jammed together, and against said non-rotatable abutment and arrested against rotation and wherein one of said abutments comprises a collar fixed to said spindle and the other is acted upon by a spring engaging a fixed part of the device and wherein means are provided for retaining the latter abutment in a position away from an end indicating member so that the spring is loaded and means for releasing the abutment so that said spring urges it against said end indicating member.

26. A timing device according to claim 8 wherein said indicating members are all rotatably mounted on a spindle so as to be coaxial with one another and wherein said indicating members are both rotatable and axially slidable on said spindle with or without distance pieces between them and are disposed between two abutments relatively movable towards and away from one another and at least one of which is retained against rotation and means for imparting said relative movement whereby the indicating members, and distance pieces when used, may be jammed together and against said non-rotatable abutment and arrested against rotation and wherein one of said abutments comprises a collar fixed to said spindle and the other is acted upon by a spring engaging a fixed part of the device and wherein means are provided for retaining the latter abutment in a position away from an end indicating member so that the spring is loaded and means for releasing the abutment so that said spring urges it against said end indicating member and wherein said retaining means comprise an electro-magnet which is fixed and has a spring loaded armature engageable with or fixed to said abutment and in which said spindle is axially movable against a spring in a direction to move the indicating members, abutment and armature so that the latter is held by the electro-magnet when energized whereafter said spring draws the spindle and indicating members away from the abutment and so that when the electro-magnet is disengaged the spring loaded armature forces said abutment against the end indicating member.

<center>No references cited.</center>